(12) United States Patent
Poisner

(10) Patent No.: US 6,842,776 B1
(45) Date of Patent: Jan. 11, 2005

(54) METHOD FOR AUTOMATIC DEVICE MONITORING BY A CENTRAL COMPUTER

(75) Inventor: David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/985,514

(22) Filed: Dec. 5, 1997

(51) Int. Cl.[7] .......................... G06F 15/16; G06F 11/00; G21C 17/00; G05B 15/02
(52) U.S. Cl. ............................ 709/208; 700/9; 700/12; 702/184; 709/201; 710/15
(58) Field of Search ................................. 709/208, 201, 709/200, 244; 700/9, 17, 276, 19; 702/184, 108; 708/134, 139; 340/825.06, 825.07, 825.08, 870.01–870.07; 379/1.01; 73/23.35, 23.36; 705/14; 345/733

(56) References Cited

U.S. PATENT DOCUMENTS

| | | | | |
|---|---|---|---|---|
| 5,051,720 A | | 9/1991 | Kittirutsunetorn | 340/310 |
| 5,086,385 A | | 2/1992 | Launey et al. | 364/188 |
| 5,099,444 A | * | 3/1992 | Wilson et al. | 708/139 |
| 5,220,522 A | * | 6/1993 | Wilson et al. | 708/134 |
| 5,309,351 A | | 5/1994 | McCain et al. | 364/132 |
| 5,400,246 A | * | 3/1995 | Wilson et al. | 700/17 |
| 5,471,190 A | | 11/1995 | Zimmermann | 340/310.01 |
| 5,553,094 A | * | 9/1996 | Johnson et al. | 375/130 |
| 5,565,855 A | | 10/1996 | Knibbe | |
| 5,892,690 A | * | 4/1999 | Boatman et al. | 700/276 |
| 5,950,144 A | * | 9/1999 | Hall et al. | 702/108 |
| 5,960,214 A | * | 9/1999 | Sharpe et al. | 710/15 |
| 6,029,092 A | * | 2/2000 | Stein | 700/11 |
| 6,088,659 A | * | 7/2000 | Kelley et al. | 702/62 |
| 6,192,282 B1 | * | 2/2001 | Smith et al. | 700/19 |
| 6,198,479 B1 | * | 3/2001 | Humpleman et al. | 345/733 |
| 6,239,722 B1 | * | 5/2001 | Colton et al. | 340/870.02 |
| 6,314,406 B1 | * | 11/2001 | O'Hagan et al. | 705/14 |
| 6,363,057 B1 | * | 3/2002 | Ardalan et al. | 370/252 |

\* cited by examiner

*Primary Examiner*—Paul H. Kang
(74) *Attorney, Agent, or Firm*—Blakely, Sokoloff, Taylor & Zafman LLP

(57) ABSTRACT

A method for monitoring a plurality of devices in a common environment. The method comprises the steps of receiving usage information from one of the devices and storing the usage information on a memory device of a computer. The method further comprises the steps of using the computer to automatically access a remote database containing information regarding the device and transmitting the stored usage information to the remote database. The information is received from the remote database and an action to be taken by the device is generated using the information from the remote database and the stored usage information.

9 Claims, 3 Drawing Sheets

METHOD FOR AUTOMATIC DEVICE MONITORING BY A CENTRAL COMPUTER

FIELD OF THE INVENTION

The present invention is in the field of automatic monitoring and control of devices by a central computer. More particularly, the present invention is in the field of automatic monitoring and control of devices by a central computer that accesses a remote database.

BACKGROUND OF THE INVENTION

Systems currently exist to monitor and control devices in an environment such as a house, factory, or commercial office building. Current systems can include stand-alone units connected to a single device. For example, such units include a module connected to a lamp where the module is programmable to control the times the lamp turns on and off. Current systems also include central controllers such as personal computers (PCs) that function as central controllers for a variety of modules that are connected to individual devices.

Controllers can communicate with controlled devices in a variety of ways. For example, a common communication method uses existing alternating current ("AC") power lines of a home to transmit signals to a control device. Many of these system use the X-10® standard code format manufactured by X-10 (USA) Inc., of Northvale, N.J. Controller modules use X-10® code format to transmit signals over the AC power line of a home through standard AC outlets. Other modes of communicating with a device include radio frequency (RF) transmission and infra red (IR) transmission.

FIG. 1 is a block diagram of prior art control system 300. Control system 300 is applicable to environment 340. Environment 340 can be a house, a manufacturing plant, or a large commercial building such as an office building, or any other environment comprising several devices. Environment 340 includes devices 310, 314, 316 and 318. Central computer 306 is connected to device 318 through transmission line 301. Central computer 306 is connected to device 316 through transmission line 302. Central computer 306 is connected to device 310 through transmission line 303, and central computer 306 is connected to device 314 through transmission line 304. Central computer 306 acts as a controller for the devices in environment 340. Central computer 306 includes memory 308 for storing software programs that direct central computer 306 to control devices to which it is connected in particular ways. Central computer 306 typically transmits commands to connected devices that turn the devices on or off or adjust the devices. For example, in the case of a thermostat, central computer 306 transmits signals to turn the thermostat on or off and also to adjust the temperature setting of the thermostat. If environment 340 is a home environment, devices connected to central computer 306 can include any home appliances or entertainment devices such as refrigerators, stereos, toasters, dishwashers, etc.

Central computer 306 can be connected through transmission lines 301 through 304 to respective devices either directly or through an individual controller module such as an X-10® module.

System 300 is capable of transmitting command signals to devices and monitoring devices by receiving signals from them. For example, central computer 306 can receive data such as measurement data, process the data under direction of software stored in memory 308, and take some action in response. Central computer 306 can also be directed to collect certain data from connected devices or send certain commands to connected devices by user input from, for example, a keyboard. Devices connected to central computer 306 may be intelligent devices which include microprocessors that can receive, process and transmit signals in the format used by central computer 306. For example, an intelligent device can be an oven that receives a command to self-clean and, in response, initiates a self-clean cycle.

Prior systems such as system 300 possess a disadvantage in that they are incapable of adjusting the nature of data transmissions between central computer 306 and connector devices without user intervention. That is, if it desirable or necessary to make any changes in the operation of central computer 306 with respect to control of devices connected to it, a user must input data manually to direct central computer 306 or change a program stored in memory 308. Therefore, if a manufacturer of a device connected to central computer 306 were to issue new maintenance procedures or a recall notice affecting the device, the user of the device would only be aware of the manufacturer information because the user looked for it. If the user received the manufacturer information, the user would have to manually enter changes to the software programs on central computer 306 to benefit from the information.

SUMMARY OF THE INVENTION

A method for monitoring a plurality of devices in a common environment is described. The method comprises the steps of receiving usage information from one of the devices and storing the usage information on a memory device of a computer. The method further comprises the steps of using the computer to automatically access a remote database containing information regarding the device and transmitting the stored usage information to the remote database. The information is received from the remote database and an action to be taken by the device is generated using the information from the remote database and the stored usage information.

DETAILED DESCRIPTION

A computer implemented method for monitoring and controlling a plurality of devices in a common environment will be described. The method includes automatically communicating with devices and automatically connecting to a remote database at specified intervals to collect information regarding specific devices. The information regarding specific devices is automatically processed and used to generate reports regarding maintenance of the device and also to alter the nature or frequency of commands transmitted to a device from a central controller.

Figure 1:
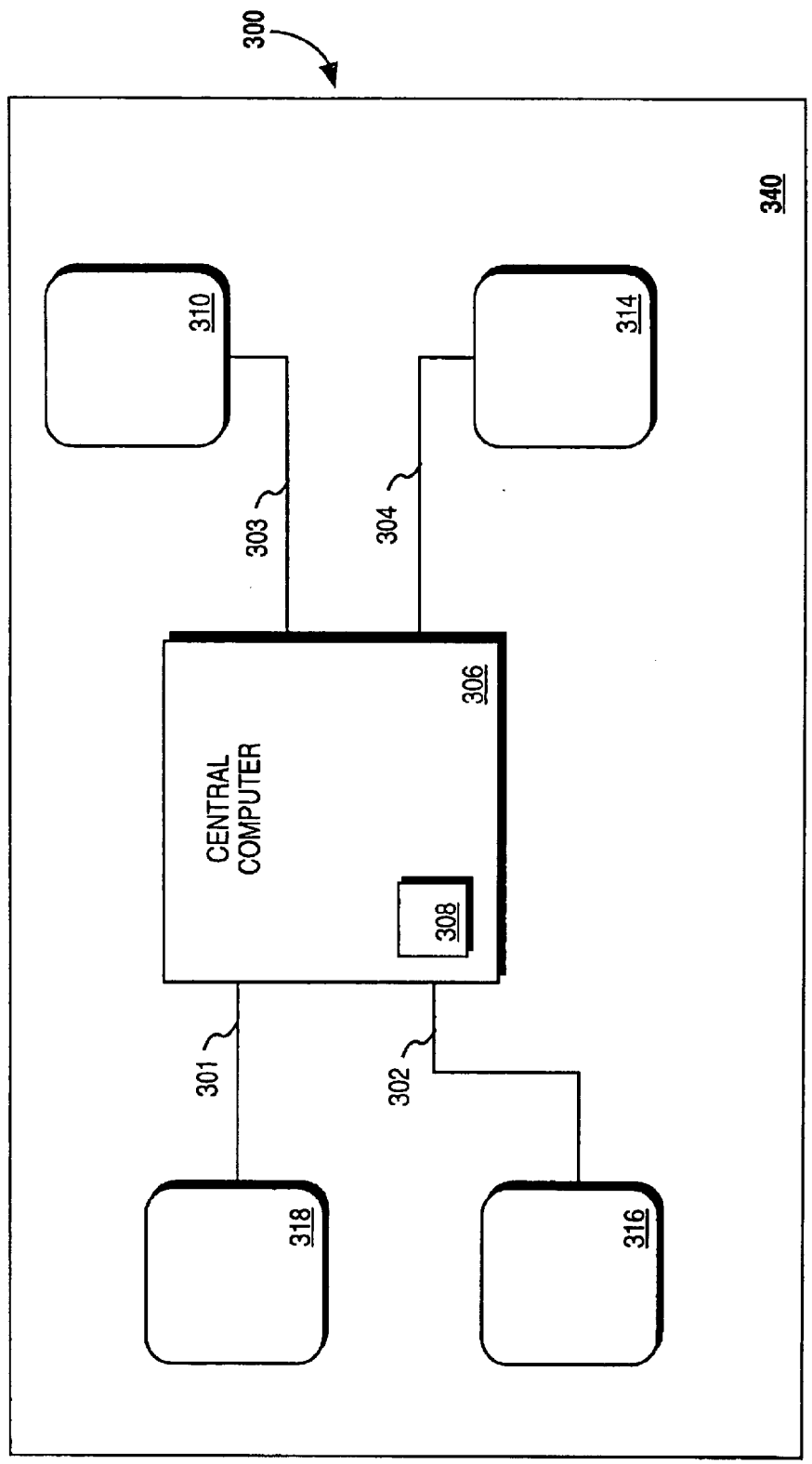
FIG. 1 is a block diagram of a prior art system for monitoring and controlling coupled devices.
Figure 2:
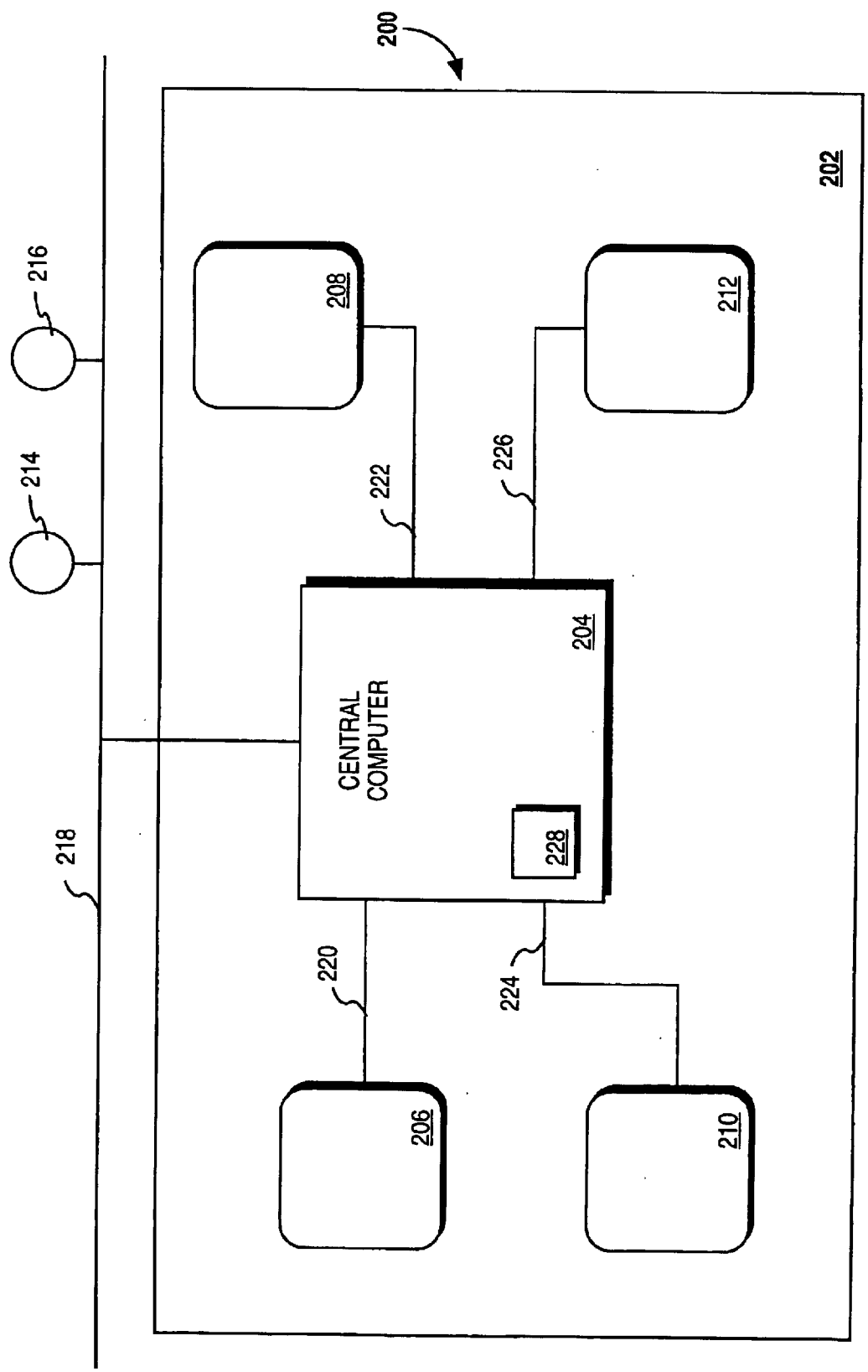
FIG. 2 is a block diagram of a system for monitoring and maintaining coupled devices according to one embodiment of the present invention.

FIG. 2 is a block diagram of a system 200 which can be used with the computer implemented method of the present invention. System 200 is applicable to common environment 202. In this embodiment, common environment 202 is a house. In other embodiments, environment 202 can be, for example, a factory, a large commercial building, or any other environment in which devices are grouped. Environment 202, in this embodiment, includes devices 206, 208, 210, and 212. Devices 206, 208, 210, and 212, in this embodiment, are home appliances and entertainment equipment such as a dishwasher, washing machine, refrigerator, stereo, television, etc. Environment 202 further includes central computer 204, which in this embodiment acts as a central controller and maintenance monitor under the direction of software stored in memory 228 of central computer 204. Various devices of devices 206, 208, 210, and 212 are intelligent devices. Intelligent devices receive, transmit and process signals of the format used by central computer 204. Intelligent devices can be directed to take some action by signals from central computer 204. For example, central computer 204 can direct an intelligent television/VCR device to program itself to tape a certain television program.

Central computer 204 is coupled to external transmission line 218. External transmission line 218, in one embodiment, is a telephone line for connecting to remote databases through a modem (not shown) of central computer 204 according to known protocols. In another embodiment, transmission line 218 is a point-to-point connection between central computer 204 and a remote database (external to system 200). Databases 214 and 216 are coupled to transmission line 218. Databases 214 and 216 are, in one embodiment, a remote server accessed via a point-to-point connection and a database of a web site, respectively. In other embodiments, more or fewer than two databases may be coupled to transmission line 218.

Figure 3:
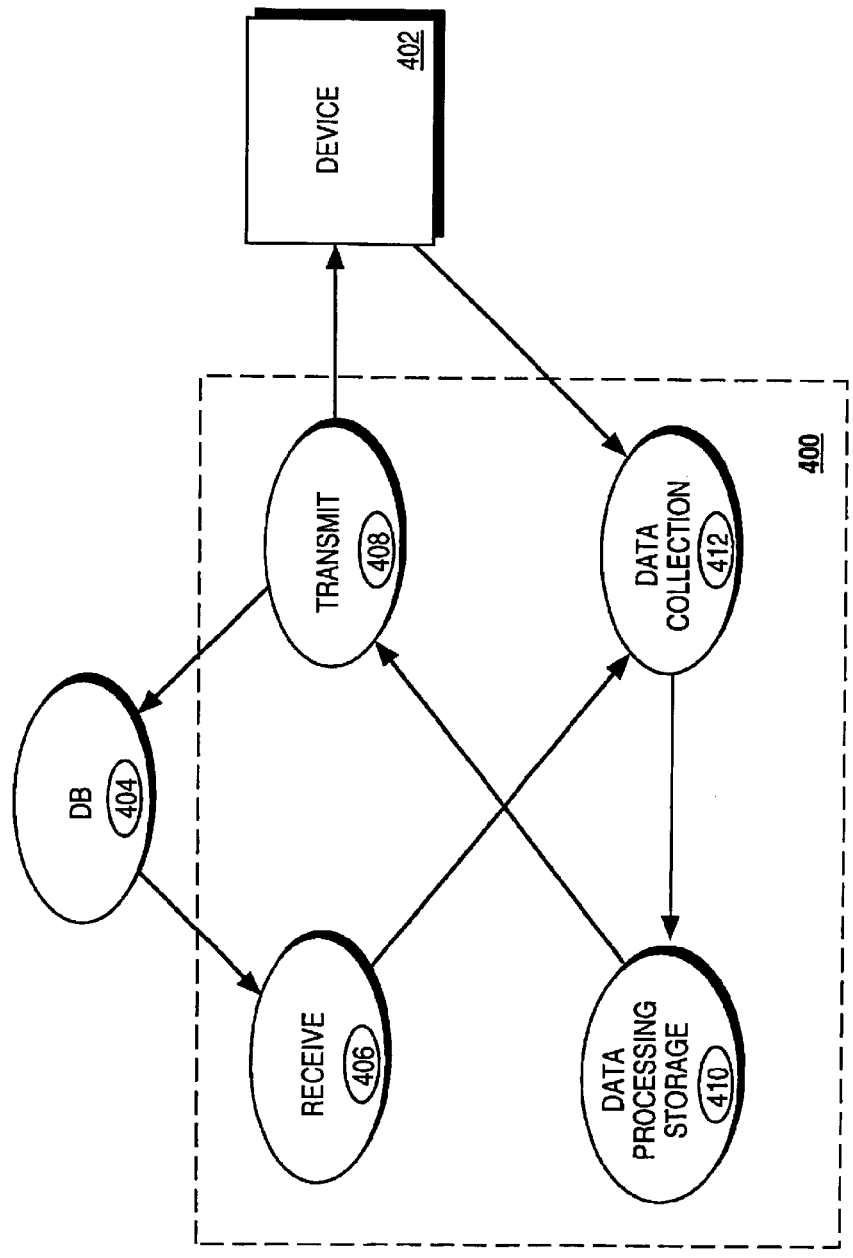
FIG. 3 is a block diagram of the structure of a software program of one embodiment.

FIG. 3 is a block diagram of the structure of software program 400 according to one embodiment. Software program 400 is stored on the memory device of central computer 204. Software program 400 includes receive module 406, transmit module 408, data processing module 410, and data collection module 412. Transmit module 408 transmits data to exemplary database 404 and to exemplary device 402. In other embodiments, transmit module 408 transmits data indirectly to device 402 through a local dedicated controller of device 402 (not shown in this embodiment). Transmit module 408 performs the functions necessary to communicate with database 404, for example, logging onto the internet to access a web page containing the database. In some embodiments, transmit module 408 periodically polls a database via a point-to-point connection. Transmit module 408 communicates with database 404 automatically on a regular basis and queries database 404 regarding information specific to device 402. When device 402 is initially added to a system that includes software 400 of this embodiment, an identifier unique to device 402 is entered into data processing/storage module 410. The identifier of device 402 can be entered manually via a user in one embodiment. In embodiments in which device 402 is an intelligent device, transmit module 408 directs device 402 to transmit its identifier to data collection module 412 which transmits it in turn to data processing/storage module 410. In the event of a periodic query of database 404 by transmit module 408, transmit module 408 uses the identifier to request information unique to device 402 from database 404.

Data collection module 412 may also include a counting function that stores usage and maintenance history in terms of how often the appliance is used, how often device 402 is used, the total hours the device 402 is used in a given period of time and how often device 402 is maintained in a given period of time.

Database 404 contains a wide range of sets of information specific to different devices. For example, manufacturers of specific devices can assemble information regarding the devices for storage on database 404 and dissemination therefrom. Manufacturers of specific appliances can post current suggested maintenance procedures and schedules on database 404. In addition, manufacturers can post latest recall or warning information regarding specific devices. In environments containing systems such as system 200 of FIG. 2, the control of devices coupled to central computer 204 can change based on current information received from database 404. Information transmitted to database 404 by transmit module 408 includes information obtained from device 402. For example, the information includes how often the device is used, that is, how often the device is turned on in a period of time. The information also includes total hours the device is operational over a given period of time. Information also includes how often the device is subjected to a maintenance procedure and the type of a maintenance procedure. In one embodiment, the information regarding usage is collected by central computer 204 by automatic monitoring under the direction of software 400 and information regarding maintenance operations is entered manually. In other embodiments, intelligent devices are able to automatically transmit maintenance information.

The maintenance information and usage information transmitted to database 404 by transmit module 408 is compiled and stored in database 404. Database 404 may be accessed by many environments that include a same type of device. For example, device 402 may be a home appliance with a certain unique identifier that is contained in many households that include systems such as system 200. In this way, database 404 collects very extensive and accurate information regarding the maintenance and usage history of devices of a particular type. This information is extremely useful to manufacturers of devices. Typically, manufacturers spend significant time and effort trying to collect accurate information about devices that they sell. Manufacturers are interested in knowing how devices perform in their normal environments, for example, which particular parts wear out and when, and the impact that maintenance has on the life of the device or its constituent parts.

Receive module 406 receives specific information from database 404 that is placed in database 404 by the manufacturer of device 402. The information is transmitted to data collection module 412 which routes it to data processing/storage module 410. Data processing/storage module 410, in one embodiment, generates periodic reports that specify device 402 by its identifier and indicate whether any changes in the maintenance schedule of device 402 should take place. The reports also indicate whether there are any unusual warnings or recalls that effect device 402. In this way a user (for example, a consumer in the case of a home environment) is able to automatically obtain the most current information that the manufacturer possesses related to device 402. This is useful because if devices are maintained properly they stay in service longer and are usually more energy efficient.

In one embodiment that includes intelligent devices capable of receiving and acting on commands from a central controller, the central controller commands a device to take a specific action as a result of data received from a remote database and processed according to the present invention.

The present invention has been described in terms of particular embodiments. Various modifications and alterations might be made by those skilled in the art without departing from the spirit and scope of the invention as set forth in the following claims.

What is claimed is:

1. A method comprising:

collecting usage information from a smart appliance having a unique identifier at a central computer sharing a physical environment with the smart appliance;

sending a periodic poll requesting maintenance from the central computer to a remote database, the remote database being maintained and periodically updated by a seller of the smart appliance;

receiving the requested maintenance from the remote database at the central computer in response to the periodic poll, the maintenance information being related to scheduled repairs of the smart appliance having the unique identifier;

determining whether the smart appliance is due for a scheduled repair using the received maintenance information and the collected usage information; and transmitting a control signal from the central computer to the smart appliance, the control signal being generated by the central computer based on the maintenance information received from the remote database, wherein the control signal functionally operates the smart appliance.

2. The method of claim 1, wherein the seller of the smart device comprises one or more of a manufacturer of the smart device, a wholesaler of the smart device, and a retailer of the smart device.

3. The method of claim 1, wherein the central computer polls the remote database using an Internet connection.

4. A machine-readable medium storing a set of instructions that, when executed by a processor of a central computer cause the central computer to perform operations comprising:

collecting usage information from a smart appliance having a unique identifier at a central computer sharing a physical environment with the smart appliance;

sending a periodic poll requesting maintenance information from the central computer to a remote database, the remote database being maintained and periodically updated by a seller of the smart appliance;

receiving the requested maintenance information from the remote database at the central computer in response to the periodic poll, the maintenance information being related to scheduled repairs of the smart appliance having the unique identifier;

determining whether the smart appliance is due for a scheduled repair using the received maintenance information and the collected usage information; and transmitting a control signal from the central computer to the smart appliance, the control signal being generated by the central computer based on the maintenance information received from the remote database, wherein the control signal functionally operates the smart appliance.

5. The machine-readable medium of claim 4, wherein the seller of the smart device comprises one or more of a manufacturer of the smart device, a wholesaler of the smart device, and a retailer of the smart device.

6. The machine-readable medium of claim 4, wherein the central computer polls the remote database using an Internet connection.

7. A central computer system comprising:

a communications device to be coupled to a network to enable the central computer to communicate with a remote database and a smart appliance having a unique identifier;

a processor coupled to the communications device, the processor enabled to:

collect usage information from a smart appliance;

send a periodic poll requesting maintenance information to a remote database, the remote database being maintained and periodically updated by a seller of the smart appliance;

receive the requested maintenance information from the remote database in response to the periodic poll, the maintenance information being related to scheduled repairs of the smart appliance having the unique identifier;

determine whether the smart appliance is due for a scheduled repair using the received maintenance information and the collected usage information; and transmit a control signal to the smart appliance, the control signal being generated based on the maintenance information received from the remote database, wherein the control signal functionally operates the smart appliance.

8. The central computer system of claim 7, wherein the seller of the smart device comprises one or more of a manufacturer of the smart device, a wholesaler of the smart device, and a retailer of the smart device.

9. The central computer system of claim 7, wherein the communications device comprises a modem.

* * * * *

UNITED STATES PATENT AND TRADEMARK OFFICE
CERTIFICATE OF CORRECTION

PATENT NO. : 6,842,776 B1
DATED : January 11, 2005
INVENTOR(S) : Poisner

It is certified that error appears in the above-identified patent and that said Letters Patent is hereby corrected as shown below:

Column 5,
Line 6, after "maintenance", insert -- information --.

Column 10,
Line 6, after "maintenance", insert -- information --.

Signed and Sealed this

Tenth Day of May, 2005

JON W. DUDAS
*Director of the United States Patent and Trademark Office*